United States Patent [19]
Usui et al.

[11] 3,749,419
[45] July 31, 1973

[54] VEHICULAR SAFETY DEVICE

[75] Inventors: Keizaburo Usui, Yokosuka; Ken'Ichi Mitsuashi, Tokyo; Michio Yamaguchi, Yokohama, all of Japan

[73] Assignee: Nissan Motor Company, Limited, Yokohama City, Japan

[22] Filed: Apr. 29, 1971

[21] Appl. No.: 138,529

[30] Foreign Application Priority Data

May 4, 1970 Japan.......................... 45/43853

[52] U.S. Cl............................... 280/150 AB, 137/68
[51] Int. Cl............................................ B60r 21/10
[58] Field of Search................. 280/150 AB; 169/28; 137/68; 220/47

[56] References Cited
UNITED STATES PATENTS
| | | | |
|---|---|---|---|
| 3,567,245 | 3/1971 | Ekstrom | 280/150 AB |
| 3,027,903 | 4/1962 | Thorp | 137/68 |
| 2,436,364 | 2/1948 | McDowell | 169/28 X |
| 2,972,998 | 2/1961 | Detwiler | 137/68 |
| 3,547,467 | 12/1971 | Pocidsk | 280/150 AB |

Primary Examiner—Kenneth H. Betts
Attorney—McCarthy, Depaoli, O'Brien & Price

[57] ABSTRACT

An improved vehicular safety device is disclosed which is adapted to protect a vehicle occupant or a pedestrian from injury in the event of a collision of a motor vehicle. The safety device includes an inflatable confinement or a protector bag which is arranged to be rapidly expanded to a protective position immediately when the collision is encountered by the motor vehicle. The protector bag is expanded with a pressurized gas which is supplied from a pressurized gas generator which is closed by a rupturable sealing member. The sealing member is torn apart to open the gas generator by means of a mechanism including an explosive means activated when the collision condition is responded to by the safety device and a piston which is projected against the sealing means when the explosive means is activated.

8 Claims, 3 Drawing Figures

PATENTED JUL 31 1973

3,749,419

INVENTORS
Keizaburo Usui, Ken'ichi Mitsuhashi, and
Michio Yamaguchi
BY
McCarthy, Depaoli, O'Brien & Price
ATTORNEYS

VEHICULAR SAFETY DEVICE

This invention relates to vehicular safety devices, and more particularly to a vehicular safety device of the type using an inflatable confinement or a protector bag which is adapted to be expanded and projected to a position in which a vehicle occupant or a pedestrian involved in a collision of a motor vehicle is protected from striking against structural parts of the motor vehicle.

The inflatable confinement in the expanded protective position is located intermediate between the vehicle occupant and structural parts of the vehicle cabin such as a windshield, an instrument panel, a steering wheel and a seat back or between the pedestrian and external structural parts of the vehicle body whereby shocks and impacts resulting from the collision are absorbed by the expanded confinement.

In order that the vehicular safety device of the described type operates with utmost reliability during the collision, it is of crucial importance that the inflatable confinement be expanded projected to the protective position as fast as possible when the collision is encountered by the motor vehicle. Improvements have thus far made on the safety device so that the collision condition is detected instantaneously and the inflatable confinement assumes the protective position as rapidly as possible.

The inflatable confinement, which is normally held in a collapsed position when stowed, is expanded with a pressurized gas blown thereinto. This pressurized gas is supplied from an appropriate pressurized gas supply unit including a normally closed pressurized gas generator adapted to supply the pressurized gas when opened and a suitable sealing means which normally closes the gas generator. The sealing means is associated with an impact-responsive triggering means which is actuated in response to an impact caused by the collision of the motor vehicle. The sealing means is released from the gas generator when this triggering means is actuated, thereby admitting the pressurized gas into the inflatable confinement which is in the collapsed position. This invention is directed generally to the thus arranged pressurized gas supply unit and, more specifically, to the sealing means of such unit.

It is, therefore, an object of this invention to provide a vehicular safety device having an improved pressurized gas supply unit by which the pressurized gas is supplied to the inflatable confinement immediately when the impact-responsive triggering means is actuated in response to the collision condition of the motor vehicle.

It is another object of the invention to provide a vehicular safety device having an improved pressurized gas supply unit which is simple in construction and which is advantageous for its ease of assembling during production.

This invention thus generally contemplates provision of a vehicular safety device which operates reliably and rapidly and which can be manufactured economically.

These and other objects and features of this invention are attained basically in a vehicular safety device comprising an inflatable confinement of the described nature, pressurized gas generating means adapted to supply a pressurized gas and having a pressurized gas discharge spout, a rupturable sealing member which is releasably secured to the discharge spout of the gas generator, a receptacle which is releasably secured to the discharge spout by means of the sealing member wherein the receptacle has an internal bore which is open at both ends and which is directed toward the sealing member, a piston which is releasably mounted in the bore in the receptacle, and end plug received in the bore and engaging with the sealing member for closing the bore, an explosive means embedded in the piston and located in contact with an outer face of the piston, and an impact-responsive triggering means which is connected to the explosive means and which is actuated in response to an impact resulting from the collision of the motor vehicle. The explosive means is activated or blasted when the triggering means is actuated and, as a result, the piston is projected against the sealing member which consequently is torn apart. The pressurized gas is admitted into the inflatable confinement through the now open discharge spout with the result that the inflatable confinement is inflated to its expanded protective position during the collision of the motor vehicle.

Drawings illustrate a preferred embodiment of this invention, in which.

Figure 1:
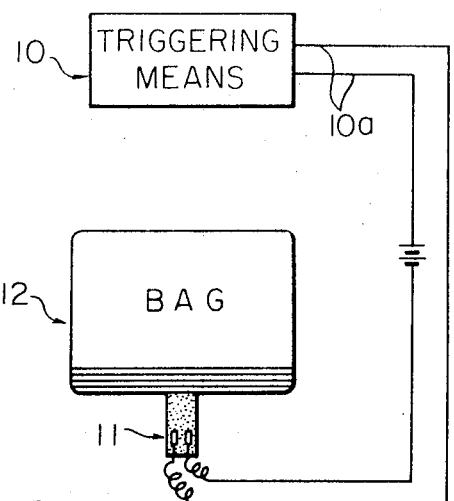
FIG. 1 is a schematic view showing a general construction of the vehicular safety device dealt with by this invention.
Figure 2:
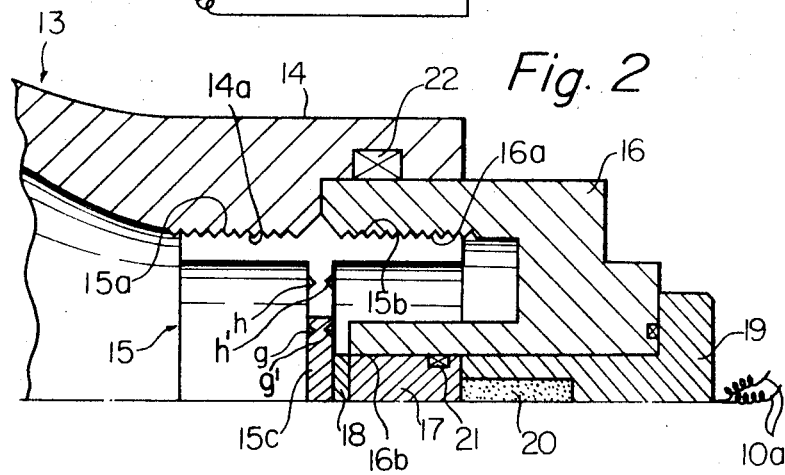
FIG. 2 is a longitudinal sectional view showing the half of a pressurized gas supply unit of the safety device according to this invention.
Figure 3:
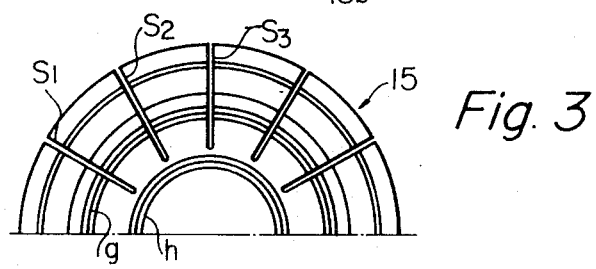
FIG. 3 is a plan view showing the half of the rupturable sealing member forming part of the pressurized gas supply unit of FIG. 2.

Reference is first made to FIG. 1 illustrating in a diagrammatic form a general construction arrangement of the vehicular safety device in which the pressurized gas supply unit shown in FIGS. 2 and 3 is to be incorporated. The safety device as shown largely consists of an impact-responsive triggering means 10 which is adapted to be actuated in response to an impact resulting from a collision of a motor vehicle. Since the manner in which the triggering means responds to such impact and is thereby actuated may be as desired, no specific description thereof will be herein incorporated for simplicity of discussion. The triggering means 10 is associated with or connected to a pressurized gas supply unit 11 which is adapted to supply a pressurized gas when the triggering means 10 is actuated. This pressurized gas supply unit 11 includes a pressurized fluid reservoir which may be constructed in any desired manner. The pressurized fluid reservoir, for instances, may contain a gas under pressure or a liquefied gas which is ready to be converted into a gas under pressure. Or otherwise, the pressurized fluid reservoir may have stored therein an explosive which is adapted to produce a gas under pressure when blown up by suitable firing means. The pressurized gas supply unit 11 is connected to an inflatable confinement or a protector bag 12 through a suitable duct means (not shown). The inflatable confinement 12 may be secured to any part or parts of the motor vehicle. This inflatable confinement 12 is normally stowed in a collapsed or folded position and, when expanded with the pressurized gas blown thereinto, projected to a position intervening the vehicle occupant and the structural parts of the vehicle cabin or between the pedestrian and the external structural parts of the vehicle body, as previously noted.

Of the units illustrated in FIG. 1, the pressurized gas supply unit 11 in particular is improved by this invention with a view to rapidly passing the pressurized gas to the inflatable confinement 12 as soon as the triggering means 10 is actuated. A preferred form of the pressurized gas supply unit constructed to this end is now illustrated in FIG. 2.

Referring to FIG. 2, the pressurized gas supply unit includes a pressurized fluid reservoir 13 which is adapted to a gas under pressure when opened. This gas generator 13 is provided with a pressurized gas discharge spout 14 which is associated with a rupturable connector 15 which is releasably secured to the discharge spout 14. Though constructed in any desired manner, this rupturable connector 15 is shown as comprising a generally cylindrical portion having spaced externally threaded peripheral walls 15a and 15b and a rupturable disc portion 15c connected at its circumference to the cylindrical portion. In this instance, the discharge spout 14 has at its leading end portion an inertially threaded peripheral wall 14a whereby the connector 15 is screwed to the discharge spout 14 through engagement between the externally threaded peripheral wall 15a of the connector and the internally threaded peripheral wall 14a of the discharge spout. The cylindrical portion, as shown in FIG. 2, consists of a plurality of segments divided by axially extending slots. The rupturable sealing disc portion 15c is provided with weakened portions which are intended to give rise to a stress produced in the sealing means 15 when the disc portion 15c is subjected to an external force, thereby facilitating the rupture of the disc portion. Such weakened portions may include substantially concentrical annular grooves $g$ and $h$ formed on one side of the disc portion 15c as seen in FIG. 3. If desired, additional annular grooves $g'$ and $h'$ which are respectively aligned with the grooves $g$ and $h$ may be formed on the other side of the disc portion 15c. The weakened portion may further include a plurality of angularly spaced slots $s_1, s_2, s_3, \ldots$ extending radially from the weakened portions of the disc portion 15c to the axially extending slots formed in the cylindrical portion. These radial spots may preferably be spaced from each other at an angle of about 30°, according to the experiments conducted by us. The numbers and configurations of the annular grooves and the radial slots are not limited to those illustrated and can be selected depending upon the operation requirements of the safety device on which the arrangement shown is to be used.

A cop member 16 is releasably secured to the discharge spout 14 through the connector 15. In the shown arrangement, the cap member 16 has an internally threaded peripheral wall 16a which is in engagement with the externally threaded peripheral wall 15b of the connector 15 by way of example. The cap member 16 has an annular chamber which is coaxial with an axial cylindrical passage-way of the gas discharge spout and open opposite thereto, and an axial bore 16b which is concentric with and internal of the annular axis chamber, and which is open at both ends and which is directed toward or in alignment with the disc portion 15c of the sealing member 15. A piston 17 is slidably mounted in this internal bore 16b, engaging with the disc portion 15c of the sealing member 16 preferably through a packing 18 as shown. The cap member 16 receives in its bore 16b an end plug 19 which is located in contact with the piston 17, thus closing the internal bore 16b in the cap member. An explosive means 20 is embedded in the end plug 19, located in contact with an outer face of the piston 17. This explosive means 20 is connected to the impact-responsive triggering means 10 (FIG. 1) through the lines 10a and is activated or blasted when the triggering means is actuated. Designated by reference numerals 21 and 22 are packings which are respectively interposed between the piston 17 and a wall structure defining the bore 16b of the cap member 16 and between the cap member and the discharge spout 14.

It is to be noted that, since there is no pressure difference across the disc portion 15c of the connector 15 due to the presence of the radial slots $s_1, s_2, s_3, \ldots$ This is advantageous because the disc portion 15c may have a significantly reduced thickness so that the disc portion can be ruptured by a small amount of explosive force.

When, now, the motor vehicle encounters a collision while it is travelling, the impact-responsive triggering means 10 responds to the collision condition and is thereby actuated so as to activate the explosive means 20. This causes the piston 17 to be projected against the rupturable disc portion 15c of the connector 15. The disc portion 15c is thus torn apart into pieces which are divided by the annular grooves and radial slots formed in the disc portion. The cylindrical portion of the connector 15 is broken into segments and is released from the discharge spout 14 with the result that the cap member 16 is removed from the spout 14. The pressurized fluid reservoir 13 is opened in this manner so that the pressurized gas is admitted into the inflatable confinement 12 (FIG. 1) through a duct (not shown) providing communication between the discharge spout 14 and the inflatable confinement. The inflatable confinement which has thus far been in the collapsed stowed position is expanded and projected to the protective position instantaneously, isolating the vehicle occupant or the pedestrian from the structural parts of the motor vehicle during the collision.

It is now apparent from the foregoing description that the pressurized gas supply unit forming part of the vehicular safety device embodying this invention is advantageous because of the fact that the pressurized gas is passed to the inflatable confinement almost instantaneously when the collision condition of the motor vehicle is responded to by the triggering means and that the pressurized gas supply unit is simple in construction and economical to manufacture. The safety device of this nature is thus not only reliable in performance but adapted for quantity production for its ease of assembling.

What is claimed is:

1. In a safety device for protecting an occupant of a vehicle of the type which includes an inflatable confinement having a collapsed inoperative position and an expanded operative position in which the inflatable confinement is operable to restrain movement of the occupant during a collision, a pressurized fluid reservoir provided with a discharge spout having an inner wall defining an axial cylindrical passage-way for fluid flow from the reservoir to the inflatable confinement; a cap member coaxially associated with the axial cylindrical passage-way of said reservoir, said cap member having an annular axial chamber which is open at one end thereof opposite to and in alignment with the axial cylindrical passage-way, and having an axial internal bore which is concentric with and internal of the annular chamber; a rupturable connector associated with said discharge spout and said cap member and located in the axial cylindrical passage-way and the annular axial chamber, said rupturable connector having a cylindrical portion connecting said cap member with said discharge spout in an axial tight relationship, the cylindrical portion consisting of a plurality of segments divided by axially extending slots formed therein, said rupturable connector having a rupturable disc portion interconnecting the segments at its outer periphery; a piston slidably received in the internal axial bore of said cap member in the vicinity of the disc portion of said rupturable connector; and a plug member received in the internal axial bore of said cap member in tightly sealed relationship therewith and provided with a detonation for urging said piston toward the disc portion of said rupturable connector when fired by triggering means during collision of the vehicle.

2. In a safety device according to claim 1, wherein the rupturable disc portion is provided with weakened portions at the center thereof and located in alignment with said piston.

3. In a safety device according to claim 2, wherein the rupturable disc portion has formed therein a plurality of radial slots extending from the weakened portions to the axial extending slots formed in the cylindrical portion.

4. In a safety device according to claim 3, wherein the weakened portions are provided with at least one annular concentric groove at one face thereof.

5. In a safety device according to claim 4, wherein the weakened portions are provided with at least one annular concentric groove at the other face thereof.

6. In a safety device according to claim 5, wherein the radial slots are angularly spaced from each other through 30°.

7. In a safety device according to claim 6, wherein the cylindrical portion is screwed to said discharge spout and said cap member.

8. In a safety device according to claim 7, wherein said piston is separated from the disc portion of said rupturable connector by a packing.

* * * * *